United States Patent [19]

Harelstad et al.

[11] Patent Number: 5,185,102

[45] Date of Patent: Feb. 9, 1993

[54] POLYMERIC CHARGE TRANSFER COMPLEXES FOR NONLINEAR OPTICAL APPLICATIONS

[75] Inventors: Roberta E. Harelstad, Bloomington; Cecil V. Francis, Woodbury; Kenneth M. White, Oakdale, all of Minn.

[73] Assignee: Minnesota Mining and Manufacturing Company, St. Paul, Minn.

[21] Appl. No.: 364,329

[22] Filed: Jun. 8, 1989

[51] Int. Cl.$^5$ .................... C09K 29/52; G02F 1/35; B02B 1/04; C08F 70/00
[52] U.S. Cl. .................... 252/582; 359/321; 359/322; 359/329; 525/379
[58] Field of Search .................... 252/299.1, 582; 359/321, 322, 329; 575/279

[56] References Cited

U.S. PATENT DOCUMENTS

| | | | |
|---|---|---|---|
| 4,378,411 | 3/1983 | Heilmann et al. | 428/500 |
| 4,657,694 | 4/1987 | Heeger et al. | 252/299.01 |
| 4,694,048 | 9/1987 | Choe | 525/376 |
| 4,702,355 | 1/1988 | Demartino | 252/582 |
| 4,724,338 | 2/1988 | Hoffmann | 307/311 |
| 4,796,976 | 1/1989 | Leslie et al. | 350/330 |
| 4,801,659 | 1/1989 | Leslie | 525/479 |
| 4,925,610 | 5/1990 | Wessling et al. | 264/101 |
| 4,935,319 | 6/1990 | Ohsawa et al. | 429/213 |
| 4,952,640 | 8/1990 | Francis | 525/328.2 |

FOREIGN PATENT DOCUMENTS 0301551 2/1989 European Pat. Off. .

OTHER PUBLICATIONS

Journal of the Optical Society of America, B, vol. 6, No. 4, Apr. 1989, T. Gotoh, et al., "Exceptionally Large Third Order Optical Nonlinearity of the Organic Charge-Transfer Complex", pp. 703-706.

M. Hanack, "Naturwiss", vol. 69, pp. 266-275, 1982.

A. F. Garito, et al., *Nonlinear Optical Properties of Polymers*, 109, pp. 91-102 (1988).

F. Kajzar, et al., *Nonlinear Optical Properties of Organic Molecules and Crystals*, 2, pp. 51-83 (1987).

P. N. Prasad, *Nonlinear Optical and Electroactive Polymers*, pp. 41-67 (1987).

G. Stegeman, et al., *Thin Solid Films*, 152, pp. 231-263 (1987).

D. M. Pepper, *Optical Engineering*, 21, pp. 156-183 (1982).

P. G. Huggard, et al., *Appl. Phys. Lett.*, 51, pp. 2183-2185 (1987).

T. Gotoh, et al., *Nonlinear Optical Properties of Materials*, 9, pp. 7-10 (1988).

P. N. Prasad, *Mol. Cryst. Liq. Cryst.*, 160, pp. 53-68 (1988).

W. D. Gill, *Photoconductivity and Related Phenomena*, pp. 303-334 (1976).

C. K. Prout, et al., *Angew. Chem. Int. Ed.*, 7(9), pp. 659-667 (1968).

R. S. Mulliken, et al., *Molecular Complexes*, pp. 1-32 (1969).

U.S.S.N. 07/341,720, filed Apr. 21, 1989, "Nonlinear Optically Active Polymers".

Primary Examiner—Robert L. Stoll
Assistant Examiner—Shean C. Wu
Attorney, Agent, or Firm—Gary L. Griswold; Walter N. Kirn; Lorraine R. Sherman

[57] ABSTRACT

This invention provides an optical medium and a process therefor wherein the medium exhibits third order nonlinear optical response and comprises a polymer with pendant groups having delocalized pi-electron character forming a charge transfer complex with dopant molecules. The optical medium is useful in optical devices, such as optical switches or light modulation devices as a component or as a coating. In other aspects, novel polymers and polymer complexes are disclosed.

28 Claims, 1 Drawing Sheet

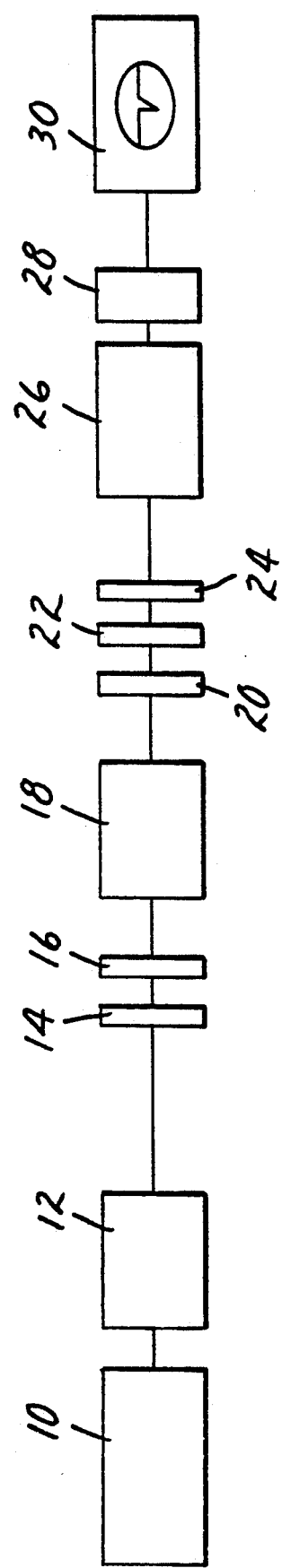

POLYMERIC CHARGE TRANSFER COMPLEXES FOR NONLINEAR OPTICAL APPLICATIONS

The United States government has certain rights in this invention pursuant to Contract No. F49620-88-C-0008 awarded by the United States Air Force Office of Scientific Research.

FIELD OF THE INVENTION

The present invention relates to optical media which exhibit third order nonlinear optical responses and a process for providing the media. In another aspect a class of novel polymer complexes useful as optical media is disclosed. The optical media can be used as components or coatings in optical devices, such as optical switches or light modulation devices.

BACKGROUND OF THE INVENTION

Organic and polymeric materials with large pi-electron delocalization are known to exhibit a nonlinear optical response, which, in many cases, is larger than that of inorganic materials. Of particular importance for organic materials is the origin of the nonlinear response in the polarization of the delocalized pi-electron cloud as opposed to displacement or rearrangement of nuclei found in inorganic materials as discussed in A. F. Garito, J. R. Heflin, K. Y. Wong, and O. Zamami-Khamiri, "Nonlinear Optical Properties of Polyenes: Electron Correlation and Chain Conformation" in *Nonlinear Optical Properties of Polymers*, Materials Research Society Symposium 109, A. J. Heeger, J. Orenstein, and D. R. Ulrich, Eds., Materials Research Society, pp. 91-102 (1988).

Nonlinear optical properties of organic and polymeric materials are well known and described in 1) F. Kajzar and J. Messier, "Cubic Effects in Polydiacetylene Solutions and Films" in *Nonlinear Optical Properties of Organic Molecules and Crystals*, D. S. Chemla and J. Zyss, Eds., Academic Press, Inc., Orlando, Fla., 2, 51-83, (1987) and 2) P. N. Prasad, "Design, Ultrastructure, and Dynamics of Nonlinear Optical Effects in Polymeric Thin Films" in *Nonlinear Optical and Electroactive Polymers*, P. Prasad and D. Ulrich, Eds., Plenum Press, New York, 41-67 (1987).

Theory and practice of nonlinear optical processes which occur by means of third order optical susceptibility, $\chi^{(3)}$ (chi-3), including intensity dependent refractive index, optical bistability, optical frequency conversion, degenerate four wave mixing, and optical phase conjugation, have potential utility in such diverse applications as optical communications, integrated optics, optical signal processing, optical sensor protection, and optical logic, and are discussed in G. Stegeman, C. Seaton, R. Zanoni, *Thin Solid Films*, 152, 231-263 (1987); D. M. Pepper, "Nonlinear Optical Phase Conjugation", *Optical Engineering*, 21, 156-183 (1982); and the reference of Kajzar and Messier (supra).

A recent patent useful as background for third order nonlinear optical properties is U.S. Pat. No. 4,796,976.

It is known in the art that thin films of organic and polymeric materials with large optical nonlinearities in combination with silicon-based electronic circuitry have potential applicability to laser modulation and deflection, information control in optical circuitry, and the like.

Conventional thrust of materials research and development for the above stated applications has been to provide a microscopically polarizable molecule or molecular segment with extended electron delocalization through conjugated pi-bonds such as are found in large, planar benzenoid hydrocarbons. Unfortunately, materials containing such extended electron delocalization suffer from attendant light absorption, severely limiting both transmission of light and available bandwidth. Furthermore, the materials are often insoluble in organic liquids and intractable, and as such, are not processable into useful device forms.

Specifically, third order nonlinear optical responses have been reported for crystals of an organic material where stacked molecules in the crystal indicate some form of intermolecular interaction [P. G. Huggard, W. Blau, and D. Schweitzer, *Appl. Phys. Lett.*, 51, (26) pages 2183-2185, (1987)]. Organic charge transfer complexes formed from organic molecules with delocalized pi-electrons such as perylene and pyrene and electron accepting molecules, such as tetracyanoethylene and tetracyanoquinodimethane are discussed in T. Gotoh, T. Kondoh, K. Egawa, and K. Kubodera, *Nonlinear Optical Properties of Materials*, 1988 Technical Digest Series 9, pp. 7-10, Optical Society of America, Washington, D.C., 1988. These complexes were examined as powders owing to the intractable nature of the materials. Powder measurements of third order susceptibilities for these complexes are larger than those reported for the highest values obtained for state of the art polymers.

The nature of resonant third order optical nonlinearity derived from photogeneration of charge carriers in a polymer composite photoconductor, consisting of poly(N-vinylcarbazole) and trinitrofluorenone, was disclosed by P. N. Prasad et al. in "Resonant Nonlinear Optical Processes and Charge Carrier Dynamics in Photoresponsive Polymers", *Mol. Cryst. Liq. Cryst.*, 160, 53-68 (1988). This publication describes various poly(N-vinylcarbazole) and trinitrofluorenone compositions and coatings whose third order susceptibility was determined by degenerate four wave mixing. In the reference, third order nonlinear optical effects derive from the response of photogenerated electron-hole pairs in a photoconductor. Absorption of light at the resonant frequency of this photoconductor is essential to the generation of these electron-hole pairs which are responsible for the nonlinear optical properties of the medium.

A background reference relating to use of charge transfer complexes in photoconductors is W. D. Gill, "Polymeric Photoconductors", *Photoconductivity and Related Phenomena*, J. Mort and D. M. Pai (Eds.), Elsevier Scientific Publishing Company, NY, 303-334 (1976). The function of the charge tansfer complex is to provide a molecular system where optical excitation at visible wavelengths generates an electrical charge which is used to neutralize an impressed electric charge in an imagewise fashion.

The concept of charge transfer in donor-acceptor complexes in general is discussed in C. K. Prout and J. D. Wright, *Angew. Chem. Int. Ed.*, 7 (9), 659-667 (1968), and in R. S. Mulliken and W. B. Person, *Molecular Complexes*, Wiley Interscience, New York, 1-32, 1969.

Radiation curable polymers having pendant ethylenically unsaturated peptide groups are disclosed in U.S. Pat. No. 4,378,411.

SUMMARY OF THE INVENTION

Briefly, the present invention provides polymeric optical media which exhibit third order nonlinear optical responses, each optical medium comprising a polymeric complex comprising a polymer having pendant groups with delocalized pi-electron character and dopant molecules that form charge transfer complexes with the pendant groups of the polymer.

In another aspect, the present invention provides a process for producing the above-described polymeric optical media which exhibit third order nonlinear optical responses.

In a further aspect, the present invention provides a device comprising a processable polymeric optical medium exhibiting a third order nonlinear optical response.

In yet a further aspect a class of novel polymers which exhibit third order nonlinear optical responses is disclosed. The novel polymers are reaction products of ethylenically unsaturated monomers with alkenyl azlactones wherein the resultant product first undergoes azlactone ring-opening with a nucleophile; this product then undergoes complexation with a dopant molecule to provide the structure as shown in formula I below.

What the background art has not taught but what this invention teaches is a processable optical medium that demonstrates third order nonlinear properties, the optical medium being a composition comprising a polymer with pendant groups having delocalized pi-electron character, and added dopant molecules which form a charge transfer complex with the pendant groups of the polymer, and a process for preparing this optical medium. The polymers are soluble in common organic solvents and the resulting solutions allow processing into useful optical devices. The present invention discloses a nonresonant process in that absorption of light at the operational optical wavelength is minimized. Light absorption reduces the efficiency of the material and may render it unsuitable for use due to induced thermal damage. Preferably, the medium of the present invention is completely transparent to light at the operational wavelength. Media of the invention preferably are electrically non-conductive, damage resistant, and are free of movable charge centers.

While not being bound by theory, in the present invention it is believed the function of the charge transfer complex is to provide a ground state delocalized electron cloud which is polarized by nonresonant interaction with the electric field of incident light. Photoexcitation of electrons to higher energy molecular states associated with electrical conduction is preferably completely suppressed.

Potential utility of organic materials with large optical nonlinearities for high frequency application in optical devices contrasts with the bandwidth limitations of conventional inorganic optical materials; hence, there is continuing research effort to develop new organic nonlinear optical materials for applications such as laser frequency conversion, phase-conjugate optics, information control in optical circuitry, light valves, optical switches, optical multiplexing-demultiplexing systems, and the like.

In addition, organic and polymeric materials may be designed and synthesized to optimize other desirable properties, such as mechanical and thermoxidative stability and high laser damage threshold, with preservation of the electron delocalization responsible for nonlinear optical effects.

In this application:

"third order nonlinear optical response" means any optical effect displayed by a medium which arises because of third order electric susceptibility, $\chi^{(3)}$, of the medium, such as third harmonic generation, intensity dependent refractive index, optical phase conjugation, degenerate four wave mixing, and the like. Magnitude of the optical effect is dependent on the third order optical susceptibility, $\chi^{(3)}$, of the medium. Fundamental concepts which describe how electric susceptibility relates the electric field and induced polarization in the medium in the nonlinear region are discussed in the ACS Symposium Series 233, American Chemical Society, Washington, D.C. (1983);

"charge transfer complex" means a composition comprising an electron donating molecular species and an electron accepting molecular species in which interaction of the molecular pi-orbitals of both species allows for transfer of electron density from donating to the accepting species, resulting in a weakly bound complex;

"electron-donating" means ability of a molecular species to transfer electron density to an electron accepting species through interaction of molecular pi-orbitals in the above-defined charge transfer complexes;

"electron-accepting" means ability of an electronegative molecular species to attract electron density from an electron donating species through interaction of molecular pi-orbitals in the above-defined charge transfer complexes;

"pi-electron delocalized pendant group" means a group attached to a polymer backbone having a bonding scheme in which pi-electrons are spread out over three or more atoms rather than localized between two specific nuclei. Such bonding, said to be delocalized, is discussed in detail by J. March in "Advanced Organic Chemistry—Reactions, Mechanisms, and Structure", 2d Edition, McGraw-Hill, N.Y., 29–41 (1977);

"processable" means the capability of the invention optical medium to be made into films (which can be supported or self-supporting), fibers, coatings and the like;

"dopant" means molecular species that are introduced into an optical medium by means of mixing, dissolving, or the like, and which remain an integral part of the inventive composition;

"highly transparent" means an optical medium which does not scatter or absorb light at a level that would render the medium unsuitable for use in a device that employs its third order nonlinear properties; and "P . . . D" means a charge transfer complex which includes P and D.

BRIEF DESCRIPTION OF THE DRAWING

The drawing is a diagrammatic representation of a typical device for demonstrating third order nonlinear optical responses of polymeric charge transfer complexes of this invention.

DETAILED DESCRIPTION AND SPECIFICATION OF INVENTION

In a preferred embodiment the present invention provides an optical medium comprising a polymeric complex which demonstrates a third order nonlinear optical response and is characterized by a recurring unit corresponding to formula I:

I where M is a recurring unit in the backbone of a polymer; P is at least one pendant group having delocalized pi-electron character with electron-donating or electron-accepting properties, and D is a dopant molecule with electron-accepting or electron-donating properties, respectively, P and D being capable of forming a charge transfer complex.

The resulting polymer can have in the range of 5 to 5,000 units, and can have a molecular weight in the range of 1,500 to 5 million.

Existence of these charge transfer complexes is evidenced by appearance of an additional band or bands in the electronic absorption or transmission spectra of polymers of the invention containing the complexes, which bands are not observed in spectra of undoped polymer or dopant molecules alone. Appearance of such bands may, but need not always, produce a color in the resultant polymeric medium that is different from the respective colors of the undoped polymer or the dopant molecules themselves. It is possible for a band corresponding to a charge transfer complex in the polymeric medium to be located in a wavelength region wherein a band corresponding to the undoped polymer or dopant molecules already exists. In such a case, although any color change would be non-existent or difficult to detect, an increase in absorption (or decrease in transmission) intensity would be observable in this wavelength region for the complex-containing polymeric medium over that of the undoped polymer or dopant molecules that also display absorption or transmission in this region.

Illustrative of the recurrent polymer unit, M, in the above formula can be the polymerization product of an ethylenically unsaturated monomer such as vinyl group-containing monomers. A discussion of such monomers is contained in C. E. Schildknecht's text "Vinyl and Related Polymers", Wiley, N.Y., 1952. Examples, which are commercially available, include vinyl aromatic monomers such as styrene; $\alpha,\beta$-unsaturated carboxylic acids such as acrylic acid, methacrylic acid and maleic acid; $\alpha,\beta$-unsaturated carboxylic acid derivatives such as methyl methacrylate, alkyl acrylate, aryl acrylate, and acrylamide; vinyl esters of carboxylic acids such as vinyl acetate; vinyl halides such as vinyl chloride; vinyl ethers such as methyl vinyl ether, and the like. Further examples of M include units derived from ethylenically unsaturated esters, carbonates, urethanes, ethers, and other condensation polymerizable monomers, all of which contain pendant P groups capable of forming charge transfer complexes with a suitable dopant molecule.

Of particular interest are dialkylaminomethylacrylic acid esters which are disclosed in U.S. Pat. No. 4,074,051. The dialkylamino group in these materials may be quaternized and replaced by a nucleophilic reagent, offering a simple means for attaching a wide range of pendant groups to methacrylic esters. When a backbone composition is a polyester, polycarbonate, polyether, polyamide, or polyurethane, the unit is capable of supporting the desired pendant groups as described above. A class of novel polymers useful in the present invention is the polymerization product of an ethylenically unsaturated monomer and an alkenyl azlactone. The desired pendant group may be incorporated in 10 to 100 percent of monomer units.

Polymeric structures of the invention may exist as homopolymers or as copolymers with varying pendant groups to optimize both nonlinear optical and physical properties. Copolymers are prepared from any comonomer which is copolymerizable with M, such as any ethylenically unsaturated monomer.

A nonlinear optical polymeric complex as defined herein preferably exhibits third order nonlinear optical susceptibility, $\chi^{(3)}$, of at least about $1 \times 10^{-12}$ esu as measured at a fundamental wavelength of 1.907 micrometers.

The desired pendant group can be part of a monomer which is to be polymerized. Alternatively, a polymer may be prepared and subsequently substituted or appropriately modified to obtain the desired final polymer having pendant groups that form complexes with the added dopant molecules.

That portion of the pendant groups having delocalized pi-electron character need not be attached directly to the polymer main chain, but may be distanced from the main chain through the introduction of additional atoms in the pendant group.

Examples of electron-donating pendant groups are, for example, aromatic and nitrogen, non-peroxidic oxygen, and sulfur-containing heteroaromatic groups having 5 to 50 carbon atoms and 0 to 10 heteroatoms, and such groups with substituent groups containing any combination of N, C, H, non-peroxidic 0, and S atoms. Preferred electron-donating pendant groups include aromatic groups such as phenyl, pyrenyl, naphthyl, perylenyl, carbazolyl, fluorenyl, and the like, and groups derived from heteroaromatics, which are commercially available, e.g., a) nitrogen containing heteroaromatics such as quinoline, isoquinoline, pyridine, bipyridyl, carbazole, acridine, indole, and the like, b) oxygen-containing heteroaromatics such as dibenzofuran, furan, benzofuran, xanthene, flavone, and the like, c) sulfur containing heteroaromatics such as thiophene, benzothiaphene, dibenzothiophene, tetrathiofulvalene and the like, d) mixed heteroatom containing heteroaromatics such as: phenothiazine, oxazoles, thiazole, benzothiazole, and the above groups appropriately substituted with electron donating groups such as amino, alkoxy groups and thioalkoxy groups and mixtures thereof.

Examples of electron-accepting pendant groups are, for example, aromatic and heteroaromatic groups having 5 to 50 atoms of which 0 to 10 can be heteroatoms selected from N, non-peroxidic 0, and S, or combinations thereof. These groups are derived, generally by removal of a hydrogen atom from a molecule, and include classes of compounds, which are commercially available such as: quinones, tetracyanoquinodimethanes, pteridines, diazines, benzodiazines, pyrazolopyrimidines and the like; and the above groups substituted appropriately with electron withdrawing groups such as nitro, cyano, trifluoromethyl, fluoro, dicyanovinyl, tricyanovinyl, and mixtures thereof.

Examples of dopant molecules with electron-accepting properties, capable of forming charge transfer complexes with electron donating pendant groups, which are commercially available or can be readily prepared by known methods, include quinoid structures such as chloranil, tetracyanoquinodimethane, p-benzoquinone, and 9,10-phenanthrenequinone. Other examples include polynitro organic compounds such as 2,4,7-trinitro-9-fluoroenone, and 1,3,5-trinitrobenzene. Also useful are compounds such as tetracyanoethylene, pyromellitic dianhydride, and halogens, such as $I_2$, and the like.

Illustrative of dopant molecules with electron-donating properties, capable of forming charge transfer complexes with electron accepting pendant groups are tetrathiafulvalene, tetraselenafulvalene, and the like. Molecules selected from the list of electron donating pendant groups can also be used, e.g., aromatic and heteroaromatic group containing compounds as previously defined.

A one-to-one correspondence between dopant molecules, (D), and polymer pendant groups, (P), need not exist to produce third order nonlinear optical response. Preferred ratios of D to P are 1:1 to 1:10.

A polymeric complex of this invention may be obtained by mixing, generally at room temperature, a solution of the polymer having pi-electron delocalized pendant groups with a solution of a suitable dopant molecule followed by precipitation of the resultant polymer complex. Identical or miscible solvents may be employed in the preparation of the polymer and dopant molecule solutions. Useful solvents include any organic liquid which does not react with or inhibit formation of precursors of the complex. In some cases the dopant may serve as complexing agent and solvent, e.g. benzene.

As an example, such a material is formed from a homopolymer or copolymer carrying one of the components of a charge transfer complex as pendant groups and mixing this with dopant solution. A particularly useful complex is formed from poly(1-vinylpyrene) and tetracyanoethylene. Highly transparent coatings of the complex, which display third order nonlinear optical activity may be prepared from this solution.

Incorporation of dopant molecules into the invention optical medium at stages other than those described in the above process is also within the scope of the present invention. For example, it is understood to be within the scope of the present invention to complex a polymerizable monomer containing group P with a dopant molecule and then polymerize the monomer to provide polymeric charge transfer complexes of the invention.

In one embodiment, polymers (designated formula V below) to which P groups are appended to provide polymers (uncomplexed) of the invention (some of which are novel) can be prepared by reaction (details of this process are disclosed in U.S. Pat. No. 4,378,411, particularly, Examples 1 and 2) of a nuceleophilic compound, HXA, wherein XA can be a portion of P (defined above), with the azlactone group of a polymer having pendant azlactone groups. This polymer (designated "azlactone polymer" IV) is known in the art and consists essentially of 10 to 100 percent, preferably 25 to 100 percent, and most preferably 30 to 100 percent, by weight of units from one or more ethylenically unsaturated azlactone monomers and 90 to 0 percent, preferably 75 to 0 percent, and most preferably 70 to 0 percent, by weight of one or more vinyl monomers (designated intermonomers) interpolymerized with the ethylenically unsaturated azlactone monomer. The following equation shows the ring-opening reaction between nucleophilic compound HXA and azlactone polymer IV to provide polymer V.

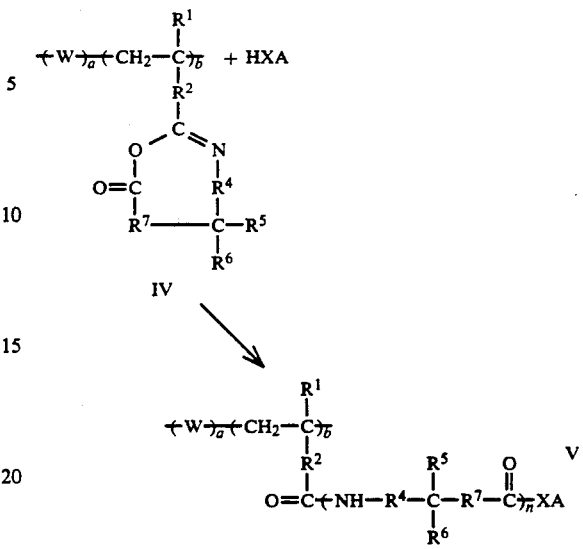

wherein

W is a copolymer unit derived from one or more monomers (e.g., any free radically polymerizable, ethylenically unsaturated monomer except those of the HXA type, because HXA type monomers cause an undesirable, premature insolubilization of interpolymer, discussed in detail below) interpolymerizable with an ethylenically unsaturated azlactone monomer;

$R^1$ is hydrogen or methyl;

$R^2$ is selected from a single bond, $-R^3-$, and $$-\overset{O}{\underset{\|}{C}}-Z-R^3-$$

in which $R^3$ is alkylene having 1 to 12 carbon atoms, preferably 1 to 6 carbon atoms, and Z is $-O-$, $-S-$, or $-NH-$;

$R^4$ and $R^7$ are independently selected from a single bond and methylene, or methylene substituted with at least one alkyl group having 1 to 12 carbon atoms;

$R^5$ and $R^6$ are independently alkyl having 1 to 12 carbon atoms or cycloalkyl having 3 to 12 carbon atoms or $R^5$ and $R^6$ taken together with the carbon to which they are joined form a 5- or 6-membered carbocyclic ring, or $R^5$ and $R^6$ independently may be H when at least one of $R^4$ and $R^7$ is methylene;

n is 1, 2 or 3;

X is $-O-$, $-NH-$, or $-S-$;

A is a non-polymerizable electron-donating group or an electron-accepting group, which groups are as previously defined; preferred groups are pyrenyl, perylenyl, fluorenyl, and carbazolyl;

a and b are independently whole integer numbers, and b is at least 1, sufficient to provide the polymer with a weight percent of W units in the azlactone containing interpolymer between about 0 and 90, preferably 0 and 75.

When a=0, a homopolymer is provided. The homopolymer or copolymer can have a molecular weight in the range of 1500 to 5 million.

Useful azlactone monomers are described in U.S. Pat. No. 4,378,411 and in "Polyazlactones", Encyclopedia of Polymer Science and Engineering, Vol. 11, Second Edition, Wiley, N.Y., 1988, pp. 558-571, both of which are incorporated herein by reference, and include:
2-vinyl-4,4-dimethyl-2-oxazoline-5-one,
2-isopropenyl-4,4-dimethyl-2-oxazolin-5-one,
2-vinyl-4,4-diethyl-2-oxazolin-5-one,
2-vinyl-4-ethyl-4-methyl-2-oxazolin-5-one,
2-vinyl-4-dodecyl-4-methyl-2-oxazolin-5-one,
2-vinyl-4,4-pentamethylene-2-oxazolin-5-one,
2-isopropenyl-4-benzyl-4-methyl-2-oxazolin-5-one, and
2-vinyl-4,4-dimethyl-1,3-oxazin-6-one.

Preferred azlactone monomers are
2-vinyl-4,4-dimethyl-2-oxazolin-5-one,
2-isopropenyl-4,4-dimethyl-2-oxazolin-5-one, and
2-vinyl-4,4-dimethyl-1,3-oxazin-6-one.

The HXA compounds are essentially any compound having delocalized pi-electron character with electron-donating or electron-accepting properties containing an active hydrogen atom; these "active hydrogen" compounds are often referred to as Zerewitnoff compounds as described by Kohler, Stone, and Fuson in *J. Am. Chem. Soc.*, 49, 3181 (1927). Suitable examples of HXA compounds are selected from the following classes of heteroaromatic Zerewitinoff compounds: alcohols, such as hydroxypyrenes, naphthols; primary amines, such as pyrenamine, naphthalenamine; and mercaptans such as 2-mercaptobenzothiazole.

Reaction of azlactone polymers and HXA compounds is conveniently accomplished by addition of the HXA compound directly to a solution of the polymer or interpolymer. No additional ingredients are required for the primary amine HXA compounds, but catalysts are required for the reaction to proceed at a reasonable rate at room temperature with the alcohol and mercaptan HXA compounds. Suitable catalysts include Bronsted acid catalysts such as p-toluenesulfonic acid or phosphoric acid and tertiary amines, Lewis acids such as $BF_3$ etherate, $AlCl_3$, $SnCl_4$, and $TiCl_4$. Progress of the ring-opening reaction can be conveniently followed by recording the infrared spectrum of the reaction mixture and observing the disappearance of the carbonyl stretching absorption at about 5.4 microns.

Preparation of polymers of Formula V wherein n=2 or 3 is given in detail in U.S. Pat. No. 4,378,411.

Details of the polymerization procedure as well as useful photoinitiators or sensitizers are given in U.S. Pat. No. 4,378,411. Preferred free radical initiators for the polymerization reaction, which are commercially available, include azobis(isobutyronitrile), benzoyl peroxide, t-butyl hydroperoxide, and the like. They can be incorporated into the polymerizable composition in the range of 0.1 to 10 weight percent.

The present invention provides a novel class of polymers which exhibit third order nonlinear optical responses. As previously noted, in one embodiment an alkenyl azlactone can be reacted with an ethylenically unsaturated monomer to provide a polymer having pendant azlactone groups. Complexation of the resultant polymer having pendant peptide groups with a dopant molecule provides the polymer of the present invention. For example, when 1-pyrenylmethanamine is the compound containing an electron donating group suitable for providing a P group in Formula I, the reaction is shown in the equations below:

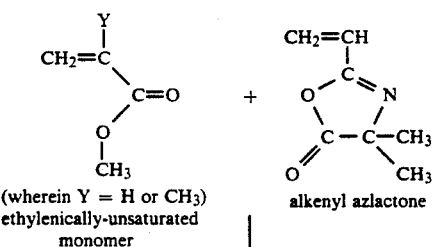
(wherein Y = H or $CH_3$) ethylenically-unsaturated monomer alkenyl azlactone

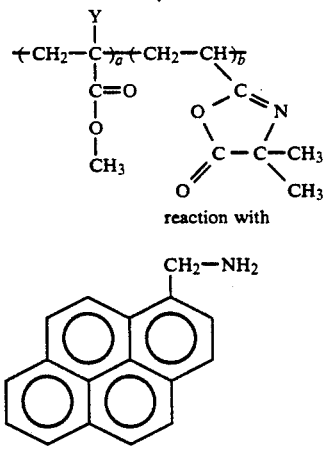
reaction with 1-pyrenylmethanamine and subsequent complexation with tetracyanoethylene

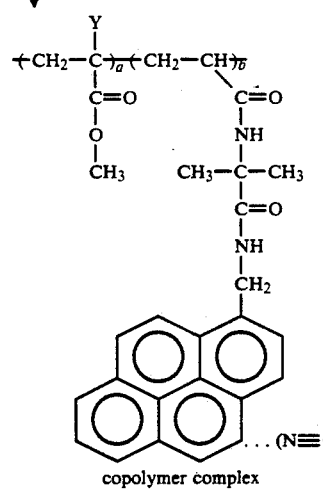
copolymer complex

II wherein a, b, and Y are as previously defined.

Any dopant molecule D as previously defined which is capable of forming a charge transfer complex with the pendant group of the polymer is useful in nonlinear optical applications.

Compositions of the invention can also include a variety of adjuvants utilized in effective amounts for their known purpose, such as stabilizers, inhibitors, lubricants, flexibilizers, pigments, and dyes, so long as the adjuvants do not diminish the third order nonlinear optical response of the medium.

The present invention provides optical devices comprising the nonlinear optical medium of the invention. Examples of such third order optical devices comprise optical frequency converters, optical switches and modulators, optical four wave mixing devices, optical Kerr effect devices, all-optical multiplexers and demultiplexers, optical bistable devices, and the like. These and other applications are discussed in U.S. Pat. No. 4,775,215. Such optical devices may employ waveguiding of light as disclosed, for example, in G. Stegeman, C. Seaton, R. Zanoni, Thin Solid Films, 152, 231, (1987).

More specifically, a third harmonic generator comprises a laser source of coherent light radiating at a fixed fundamental frequency, an organic polymeric complex according to the present invention, a means for directing the output radiation of the laser onto the polymeric complex to provide output radiation of a third harmonic frequency, and output means for utilizing the resultant third harmonic frequency. Means for directing output radiation of the laser can be a lens, a prism, or a diffraction grating as is known in the art; and output means can be a lens, a prism, or a diffraction grating, optionally coupled with a filtering device, as is also known in the art.

Additionally, a process for converting a fixed fundamental frequency of coherent laser light into a third harmonic frequency comprises the steps of: providing a polymeric complex of the present invention, passing laser light through said polymeric complex to provide output radiation of a third harmonic frequency, the polymeric complex being transparent to the fixed fundamental frequency and to the third harmonic frequency.

The invention optical medium can be provided as an optical device in the form of a thick or thin film, such as a coating on a substrate. Representative thicknesses can be in the range of 0.1 to 50 micrometers, preferably 0.5 to 10 micrometers. The optical medium can also be in a shaped article as a fiber, rod, molded structure, or the like, as by casting, spinning, extrusion, molding, etc. Useful articles of the invention can be highly transparent.

Coating a substrate with the processable optical medium of the invention may be accomplished by conventional methods such as spraying, roller coating, dip coating, and the like. Solvent coating is a particularly useful method, resulting in highly transparent films of uniform thickness.

Suitable solvents for polymer dissolution used in the coating process comprise organic solvents which preferably are halogenated organic solvents such as chlorobenzene, chloroform, dichloromethane, dichloroethane, and the like.

Any substrate is suitable which serves as a support for the invention optical medium and does not interfere with the third order nonlinear optical response of said medium. Examples of suitable substrates include inorganic and organic materials such as glass, fused silica, ceramics, semiconductors, polymeric supports, and the like.

Objects and advantages of this invention are further illustrated by the following examples, but the particular materials and amounts thereof recited in these examples, as well as other conditions and details, should not be construed to unduly limit this invention.

EXAMPLES

All materials were commercially available unless indicated otherwise. All temperatures are reported in degrees Centigrade (° C) and products were characterized by at least one of infrared (IR)—, nuclear magnetic resonance (NMR)—, ultraviolet (UV)—, or visible—spectroscopies, or elemental analyses, or combinations thereof.

EXAMPLE I

This example illustrates the preparation of a charge transfer complex of poly(1-vinylpyrene)-tetracyanoethylene by first preparing a monomer (part A below), polymerizing the monomer (part B below), and complexing the resultant polymer with a dopant (D, tetracyanoethylene (TCNE), part C below).

A. 1-Vinylpyrene

The procedure used to prepare 1-vinylpyrene was similar to that of K. Tanikawa, T. Ishizuka, K. Suzuki, S. Kusabayashi, and H. Mikawa, Bull. Chem. Soc. Japan, 41, 2719-2722, (1968) Under an argon atmosphere, methyltriphenylphosphonium bromide (0.16 mole) was mixed with butyllithium (0.16 mole of 2.0 M butyllithium in pentane) in dry ether (660 ml.). After the ylid color was obtained (4–8 hr.), pyrene-1-carboxaldehyde (0.14 mole) in dry tetrahydrofuran (500 ml.) was added dropwise. The mixture was stirred overnight under an argon atmosphere. Ether was removed by evaporation under reduced pressure, and the remaining tetrahydrofuran solution was boiled under reflux for 1 hour. After evaporation to dryness under reduced pressure, the residue was dissolved in toluene and the resulting solution was washed with 30% aqueous sodium sulfite solution and water. Toluene was evaporated under reduced pressure to precipitate the crude product, which, after dissolving in hot ethanol and treatment with charcoal, allowed 1-vinylpyrene to crystallize as a yellow powder (53% yield), m. p. 88°-89° C. (lit 88°-89° C.). The structure was confirmed by proton NMR.

B. Poly(1-vinylpyrene)

1-vinylpyrene (17.0 g.) and azoisobutyronitrile (0.057 g., 0.33% weight/weight, w/w) were added to dry toluene (50 mL.) under an argon atmosphere. The mixture was stirred and maintained at 110°-140° C. for 24 hours. After cooling the product was precipitated in a blender by addition of an equal volume of methanol. Unreacted monomer (11% by proton NMR) was removed by Soxhlet extraction with methanol. Poly(1-vinylpyrene) (79% yield) was obtained as a pale yellow powder which was dried at 100° C. for 5 days. Proton NMR confirmed that the level of unreacted monomer was below the resolution limit (0.2 %) of the spectrometer.

C. Poly(1-vinylpyrene)-TCNE Complex

In accordance with the method of K. Tanikawa et al., [Bull. Chem. Soc. Japan, 41, 2719-2722 (1968)], chloroform (125 ml) containing tetracyanoethylene (0.3 g., 0.002 mole) was added to chloroform (10 ml) containing poly(1-vinylpyrene) (0.5 g., 0.002 mole). The solution was stirred at room temperature for one hour and allowed to stand overnight. The solution was poured into petroleum ether, and a fine precipitate was filtered, washed, and dried in a desiccator. Poly(1-vinylpyrene)-TCNE complex was obtained as a deep blue powder and its presence was confirmed by elemental and spectroscopic analysis. Based on nitrogen analyses, the ratio of pyrene units to TCNE in the complex was 6:1 (ratio of P:D was 6:1).

EXAMPLE II

This example illustrates the preparation of a poly(1-vinylpyrene)-tetracyanoquinodimethane (TCNQ) charge transfer complex according to the method of Tanikawa (supra).

Chloroform (175 ml) solution of 7,7,8,8-tetracyanoquinodimethane (0.5 g., 0.002 mole, TCNQ) was added to chloroform (10 ml) solution of poly-(1-vinylpyrene) of Example I (0.5 g., 0.002 mole). The resulting solution was stirred for one hour at room temperature and allowed to stand overnight. The solution was poured into petroleum ether and a very fine precipitate which formed was filtered, washed, and dried in a desiccator. The poly(1-vinylpyrene)-TCNQ complex was obtained as a deep green powder. Spectroscopic analysis confirmed the presence of the desired product.

EXAMPLE III

This example illustrates the use of an alternative main chain monomeric unit and a new composition of matter comprising a charge transfer complex of a copolymer of methyl methacrylate and 2-vinyl-4,4-dimethylazlactone modified by pyrene methylamine (part A below) and tetracyanoethylene (part B below) as dopant.

A.

A copolymer of 2-vinyl-4,4-dimethylazlactone and methyl methacrylate (20/80 : w/w), prepared according to the method taught in U.S. Pat. No. 4,378,411, was modified by pyrenylmethanamine according to general polymer modification methods of azlactone containing polymers taught in U.S. Pat. No. 4,451,619.

B.

Two grams of a chlorobenzene solution (20% solids) of the copolymer from Example III, Part A, were dissolved in chloroform (10 ml). To this copolymer solution was added a warm solution of tetracyanoethylene (0.04 g, 0.3 mmoles) in chloroform (45 ml) and the resulting solution allowed to stand at room temperature overnight. Ether was added until a white precipitate formed and the resulting mixture was evaporated to dryness. The resulting solid was washed with copious amounts of chloroform/ether (40/60:volume/volume) and the resulting dark green solid complex was air dried. Complex formation was confirmed by the appearance of charge transfer bands in the electronic spectrum at approximately 700 nm and 475 nm.

EXAMPLE IV

This example provides a third order nonlinear optical polymeric charge transfer medium and procedure for providing a film on a substrate, which device provides third-harmonic generation.

A. Sample Preparation

Samples (See Table I, below) for nonlinear optical evaluation were prepared using the procedure of Examples I and II. These samples were solvent coated onto substrates (glass and fused silica) in a manner similar to methods described in A. Weill and E. Dechenaux, Polymer Engineering and Science, 28, (15), 945-948, (1988). Films were then heated in a circulating air oven at 130° C. for ten minutes to remove residual solvent. In a typical preparation a 16 percent w/w solution of poly(1-vinylpyrene) in chlorobenzene was first filtered using 0.2 micrometer filters and then spin-coated onto the substrate at a rate of 1000 rpm in a nitrogen atmosphere.

B. Measurement of Optical Constants

Knowledge of the thickness and refractive index of a film is useful in determining the value of its third order susceptibility, $\chi^{(3)}$, from third-harmonic generation measurements. Thicknesses and refractive indices are determined by means of waveguiding, spectral interference and profilometric measurements.

The waveguiding evaluation made use of a fused silica substrate into which gratings were etched with a period of approximately 0.5 microns using the method disclosed in X. Mai, R. Moshrefzadeh, U. Gibson, G. Stegeman, C. Seaton, Appl. Optics, 24, 3155 (1985) and R. Moshrefzadeh, X. Mai, C.T. Seaton, G. Stegeman, Appl. Optics, 26, 2501, (1987). The film was solvent coated onto this substrate and light from a helium-neon laser was coupled into the film in the region of a grating so that light was guided in the film by total internal reflection.

Measurement of the angles relative to the surface normal at which coupling occurred for different guided modes allowed determination of both the thickness of the film and its refractive index at the 0.633 $\mu$m laser wavelength, as discussed in X. Mai, R. Moshrefzadeh, U. Gibson, G. Stegeman, Appl. Optics, 24, 9, 3155, (1985) and T. Tamir, Eds., "Topics in Applied Physics", 7, Springer-Verlag, 1979.

In the case of spectral interference, constructive and destructive interference of light passing through a film was observed as a function of wavelength. This enabled determination of the refractive index of the film at wavelength positions of maxima and minima measured in the spectrum, given the film thickness ascertained from waveguiding or profilometric procedures, as discussed in D. Halliday and R. Resnick, *Fundamentals of Physics*, 3d edition, Wiley, N.Y., (1988) pp 910-913.

C. Third Harmonic Generation

Third order nonlinear susceptibilities of polymer films were measured using third-harmonic generation. In this procedure, an input beam of laser light at a given wavelength was directed into the film which, in addition to transmitting light of fundamental frequency, generated third-harmonic light at one-third the wavelength (or three times the frequency) of the input beam.

Referring now to the Drawing, infrared radiation at 1064 nm from a laser, for example, from a commercial Q-switched Nd$^{3+}$YAG laser (neodymium:yttrium aluminum garnet) Model DCR-3G (Spectra-Physics, Mountain View, CA) 10 was directed into commercial Raman shifter (Model RS-1, Spectra-Physics) 12 which produced and isolated radiation at 1907 nm by means of ultra pure hydrogen gas at high pressure of 1.8-2.5 MPa. In the apparatus illustrated in the Drawing, the means for shaping, polarizing, and directing the output beams of the laser and Raman shifter, which are well-known to one of ordinary skill in the art, were integrated into laser 10 and Raman shifter 12 and are not separate components as shown. Output radiation from Raman shifter 12 was passed through filter 14 [Corning CS2-64 color filter (Corning Glass Works) used to block any radiation at 636 nm] and then weakly focused by lens 16 onto the film sample coated onto a fused silica substrate. The film-substrate sample was held in vacuum chamber 18 at reduced pressure (less than 20 mTorr) to eliminate contribution to the third-harmonic signal by air.

Third-harmonic radiation at 636 nm generated by the film-substrate sample was collected by lens 20 and passed through infrared blocking filter 22 to attenuate the fundamental 1907 nm radiation. The third harmonic was attenuated by neutral density filter 24 and focused by lens 20 into double monochromator 26 to isolate the third harmonic. Output of monochromator 26 was directed to photomultiplier tube 28, and the resulting signal was processed by boxcar averager 30 that averaged signals over many laser pulses.

Intensity of the third harmonic signal was varied by rotating the sample inside vacuum chamber 18 about an axis parallel to the polarization of the incident beam. This variation, recorded as a function of the angle between the beam direction and the normal to the sample surface, was analyzed by a curve fitting procedure using formulas similar to those reported by F. Kajzar, J. Messier, and C. Rosilio, J. Appl. Phys., 60, 3040, (1986). Real and imaginary parts of 102 $^{(3)}$ for the film were obtained by comparing the analysis for the film-silica sample with that for the silica substrate alone, using $\chi^{(3)} = 2.8 \times 10^{-14}$ esu for fused silica (B. Buchalter, G. R. Meredith, Appl. Opt., 21, 3221, (1982)).

Poly(1-vinylpyrene), poly(1-vinylpyrene)-TCNE, and poly(1-vinylpyrene)-TCNQ films, whose $\chi^{(3)}$ values are shown in Table I below, had thicknesses between 0.5 and 1 μm and refractive indices of 1.75 at 0.636 μm and 1.71–1.72 at 1.907 μm. Non-zero absorption coefficients were 640 cm$^{-1}$ for poly(1-vinylpyrene)-TCNE and 360 cm$^{-1}$ for poly(1-vinylpyrene)-TCNQ, both at 0.636 μm.

TABLE I

| Sample | $\chi^{(3)}$ Susceptibilities* | | |
|---|---|---|---|
| | **Re$\chi^{(3)}$ | ***Im$\chi^{(3)}$ | \| $\chi^{(3)}$ \| |
| poly(1-vinylpyrene)**** | 0.28 | 0.06 | 0.28 |
| poly(1-vinylpyrene)-TCNE | −1.4 | −0.78 | 1.6 |
| poly(1-vinylpyrene)-TCNQ | −0.71 | −0.25 | 0.76 |

*(all values are in 10$^{-12}$ esu)
**Re means real part of the complex value of the third order optical susceptibility
***Im means imaginary part of the complex value of the third order optical susceptibility
****comparative Data of Table I show an enhancement of third order nonlinear optical response of the complexed polymer compared to that of the corresponding uncomplexed homopolymer.

Various modifications and alterations of this invention will become apparent to those skilled in the art without departing from the scope and spirit of this invention, and it should be understood that this invention is not to be unduly limited to the illustrative embodiments set forth herein.

We claim:

1. An optical medium which exhibits a third order nonlinear optical response, said optical medium comprising a polymeric complex comprising a polymer having pendant groups with delocalized pi-electron character ad dopant molecules forming charge transfer complexes with the pendant groups of the polymer, said optical medium being electrically non-conductive, wherein said polymeric complex comprises recurrent monomeric units having the formula

wherein
M is a recurring unit in the backbone of a polymer which is provided by polymerization of an ethylenically unsaturated monomer or monomers capable of undergoing condensation polymerization,
P is a pendant group having delocalized pi-electron character with electron-donating or electron-accepting properties, and
D is a dopant molecule with electron-accepting or electron-donating properties, respectively, which is capable of forming a charge transfer complex with P.

2. The optical medium according to claim 1 wherein M is a recurrent unit derived from a monomer comprising a group selected from the class consisting of ethylenically unsaturated ester, carbonate, and urethane groups, and vinyl and acrylate groups.

3. The optical medium according to claim 1 wherein P is an electron-donating group selected from aromatic and heteroaromatic groups.

4. The optical medium according to claim 3 wherein P is a group selected from the class consisting of phenyl, pyrenyl, naphthyl, perylenyl, carbazolyl, and fluorenyl groups.

5. The optical medium according to claim 1 wherein P is an electron-accepting group selected from the group consisting of aromatic and heteroaromatic groups.

6. The optical medium according to claim 1 wherein P is a group selected from the class consisting of quinones, benzodiazines, pteridines, and pyrazolo-pyrimidine groups.

7. The optical medium according to claim 1 wherein said pendant group is an electron-donating group.

8. The optical medium according to claim 4, wherein said pendant group is an electron-accepting group.

9. The optical medium according to claim 4 wherein said dopant molecule has electron-donating properties.

10. The optical medium according to claim 1 wherein said dopant molecule has electron-accepting properties.

11. The optical medium according to claim 1 wherein said dopant molecule is selected from the class consisting of polynitro organic molecules and quinoid structures.

12. The optical medium according to claim 1 wherein said dopant molecule is selected from an aromatic or heteroaromatic compound having 5 to 50 carbon atoms and 0 to 10 N, S and non-peroxidic O atoms.

13. The optical medium according to claim 1 wherein said dopant molecule is selected from the class consisting of tetracyanoethylene, tetracyanoquinodimethane, and choranil.

14. The optical medium according to claim 1 wherein said dopant molecule is selected from the class consisting of tetrathiafulvalene and tetraselenafulvalene.

15. The optical medium according to claim 1 wherein the ratio of D to P is in the range of 1:1 to 1:10.

16. The optical medium according to claim 1 wherein said polymer further comprises additional copolymeric units derived from ethylenically unsaturated monomers different from M.

17. The optical medium according to claim 1 wherein said polymer is poly(1-vinylpyrene) and said dopant is tetracyanoethylene.

18. An optical device having third order nonlinear optical responses comprising the optical medium according to claim 1.

19. A process for providing a coated article or a shaped article comprising the steps:

coating a substrate with the optical medium according to claim 1, or shaping an article comprising the optical medium according to claim 1, wherein said coated or shaped article exhibits third order nonlinear optical responses.

20. A novel polymer comprising recurring units of the structure

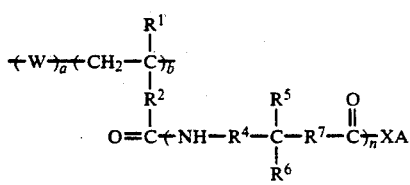   V wherein

W is a copolymer unit derived from one or more free radically polymerizable monomers interpolymerizable with an ethylenically unsaturated azlactone monomer;

$R^1$ is hydrogen or methyl;

$R^2$ is selected from a single bone, $-R^3-$, and

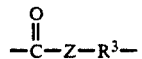

in which $R^3$ is alkylene having 1 to 12 carbon atoms, and Z is $-O-$, $-S-$, $-NH-$;

$R^4$ and $R^7$ are independently selected from a single bond and methylene, or methylene substituted with at least one alkyl group having 1 to 12 carbon atoms;

$R^5$ and $R^6$ are independently alkyl having 1 to 12 carbon atoms cycloalkyl having 3 to 12 carbon atoms or $R^5$ and $R^6$ taken together with the carbon to which thy are joined form a 5- or 6- membered carbocyclic ring, or $R^5$ and $R^6$ independently may be H when at least one of $R^4$ and $R^7$ is methylene; n is 1, 2 or 3;

X is $-O-$, $-NH-$, or $-S-$;

A is selected from the group consisting of pyrenyl, fluorenyl, perylenyl, and carbazolyl groups; a and b are independently whole integer numbers, and b is at least 1, sufficient to provide the polymer with a weight percent of W units in the azlactone containing interpolymer between 0 to 90, said polymer having a molecular weight in the range of 1500 to 5 million.

21. A novel polymeric complex comprising recurring units of the structure

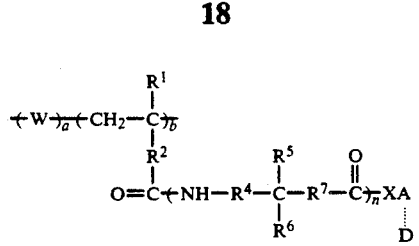

wherein

W is a copolymer unit derived from one or more free radically polymerizable monomers interpolymerizable with an ethylenically unsaturated azlactone monomer;

$R^1$ is hydrogen or methyl;

$R^2$ is selected from a single bond, $-R^3-$, and

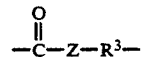

in which $R^3$ is alkylene having 1 to 12 carbon atoms, and Z is $-O-$, $-S-$, or $-NH-$;

$R^4$ and $R^7$ are independently selected from a single bond and methylene, or methylene substituted with at least one alkyl group having 1 to 12 carbon atoms;

$R^5$ and $R^6$ are independently alkyl having 1 to 12 carbon atoms cycloalkyl having 3 to 12 carbon atoms or $R^5$ and $R^6$ taken together with the carbon to which thy are joined form a 5- or 6- membered carbocyclic ring, or $R^5$ and $R^6$ independently may be H when at least one of $R^4$ and $R^7$ is methylene;

n is 1, 2 or 3;

X is $-O-$, $-NH-$, or $-S-$;

A is a non-polymerizable electron-donating group or an electron-accepting group;

a and b are independently whole integer numbers, and b is at least 1, sufficient to provide the polymer with a weight percent of W units in the azlactone containing interpolymer between 0 to 90; and D is a dopant molecule with electron-accepting or electron-donating properties, which has formed a charge transfer complex, said polymer having a molecular weight in the range of 1500 to 5 million.

22. The polymeric complex according to claim 21 wherein A is selected from the group consisting go aromatic and heteroaromatic groups having 5 or 50 carbon atoms and 0 to 10 N, S, and non-peroxidic O heteroatoms.

23. A third harmonic generator comprising a) a laser source of coherent light radiation at a fixed fundamental frequency, and b) an optical medium which exhibits a third order nonlinear optical response, the optical medium comprising a polymeric complex comprising a polymer having pendant groups with delocalized pi-electron character and dopant molecules forming charge transfer complexes with the pendant groups of the polymer, wherein said polymeric complex comprises recurrent monomeric units having the formula

wherein

M is a recurring unit in the backbone of a polymer which is provided by polymerization of an ethylenically-unsaturated monomer or monomers capable of undergoing condensation polymerization, P is a pendant group having delocalized pi-electron character with electron-donating or electron-accepting properties, and D is a dopant molecule with electron-accepting or electron-donating properties, respectively, which is capable of forming a charge transfer complex with P, c) a means for directing the output radiation of the laser onto the polymeric complex to provide output radiation of a third harmonic frequency, and d) output means for utilizing the resultant third harmonic frequency.

24. A process for converting a fixed fundamental frequency of coherent laser light into a third harmonic frequency which comprises the steps of a) providing a source of coherent laser light and providing an organic optical medium which exhibits a third order nonlinear optical response, the optical medium comprising a polymeric complex comprising a polymer having pendant groups with delocalized pi-electron character and dopant molecules forming charge transfer complexes with the pendant groups of the polymer, wherein said polymeric complex comprises recurrent monomeric units having the formula

wherein

M is a recurring unit in the backbone of a polymer which is provided by polymerization of an ethylenically-unsaturated monomer or monomers capable of undergoing condensation polymerization, P is a pendant group having delocalized pi-electron character with electron-donating or electron-accepting properties, and D is a dopant molecule with electron-accepting or electron-donating properties, respectively, which is capable of forming a charge transfer complex with P, and b) passing said laser light through said polymeric complex to provide output radiation of a third harmonic frequency;

said polymeric complex being transparent to said fixed fundamental frequency and to said third harmonic frequency.

25. The polymeric complex according to claim 21 wherein said dopant is selected from the group consisting of aromatic and heteroaromatic group-containing compounds.

26. The polymeric complex according to claim 21 wherein said dopant comprises a quinoid structure or is a polynitro organic compound.

27. The polymeric complex according to claim 21 wherein said dopant is selected from the group consisting of chloranil, tetracyanoquinodimethane, p-benzoquinone, 9,10-phenanthrenequinone, 2,4,7-trinitro-9-fluorenone, 1,3,5-trinitrobenzene, tetracyanoethylene, pyromellitic dianhydride, and halogen.

28. The optical medium as defined in claim 1 wherein said polymeric complex exhibits third order nonlinear optical susceptibility, $\chi^{(3)}$, of at least about $1 \times 10^{-12}$ esu as measured at a fundamental wavelength of 1.907 micrometers.

* * * * *